(12) United States Patent
Jansen

(10) Patent No.: US 7,703,597 B2
(45) Date of Patent: Apr. 27, 2010

(54) DEVICE FOR TURNING FLAT ARTICLES INCLUDING FOLDED BOX BLANKS

(75) Inventor: Frank Jansen, Krefeld (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 12/265,744

(22) Filed: Nov. 6, 2008

(65) Prior Publication Data

US 2009/0129911 A1 May 21, 2009

(30) Foreign Application Priority Data

Nov. 16, 2007 (DE) .................. 10 2004 054 822

(51) Int. Cl.
*B65G 47/244* (2006.01)
(52) U.S. Cl. ................. 198/415; 198/689.1; 198/861.6; 198/587
(58) Field of Classification Search ................. 198/415, 198/689.1, 861.6, 587
See application file for complete search history.

(56) References Cited

U.S. PATENT DOCUMENTS

| | | | | |
|---|---|---|---|---|
| 4,019,627 A | * | 4/1977 | Eggert et al. ................. | 198/786 |
| 4,807,739 A | * | 2/1989 | Wolf et al. .................. | 198/415 |
| 4,978,272 A | * | 12/1990 | Leon ............................ | 414/529 |
| 5,383,760 A | | 1/1995 | Cawley et al. | |
| 5,918,725 A | * | 7/1999 | Farina ........................ | 198/415 |
| 6,126,383 A | | 10/2000 | Franklin et al. | |
| 6,164,431 A | | 12/2000 | Morisod | |
| 6,503,181 B1 | | 1/2003 | Pons | |
| 6,591,966 B1 | * | 7/2003 | Lee et al. ..................... | 198/415 |
| 7,389,867 B2 | * | 6/2008 | Hillmantel et al. .......... | 198/395 |
| 7,402,129 B2 | | 7/2008 | Diehr | |
| 2006/0163035 A1 | | 7/2006 | Pahud | |

FOREIGN PATENT DOCUMENTS

EP 0 897 760 A1 2/1999
WO 02/20382 A1 3/2002

OTHER PUBLICATIONS

Official communication issued in counterpart European Application No. 08105558.4, mailed on Mar. 31, 2009.
Official communication issued in the counterpart German Application No. 10 2007 054 822.4, mailed on Nov. 16, 2007.

* cited by examiner

*Primary Examiner*—Mark A Deuble
(74) *Attorney, Agent, or Firm*—Keating & Bennett, LLP

(57) ABSTRACT

A device for the turning of flat articles, particularly blanks of folded boxes, includes conveying elements which define at least two conveying sections that are permeable to air and on which the articles are conveyed lying substantially flat, the conveying elements being mounted in a frame, a suction device arranged below the conveying element and to extend through the conveying section to increase the friction between the conveying elements and the articles, and a separate drive for each of the conveying elements of the respective conveying sections. The frame is mounted such that it can swivel about a pivot in the exit region of the frame relative to a machine frame.

4 Claims, 3 Drawing Sheets

DEVICE FOR TURNING FLAT ARTICLES INCLUDING FOLDED BOX BLANKS

BACKGROUND OF THE INVENTION

1. Field of the Invention

The present invention relates to a device for the turning of flat articles, and particularly to a device for turning folded box blanks.

2. Description of the Related Art

When making folded boxes from blanks in folded box gluing machines, various fold flaps, depending on the shape of the box, provided with a glue strip must be folded by about 180° and glued to other blank parts. Since the folding is performed at high speeds as the blanks are moved through the machine, folding elements arranged at the sides are typically used to fold the fold flaps disposed at the sides of the blanks towards the middle. Thus, the respective groove line of the side flaps extends in a direction substantially parallel to the direction of conveyance.

For certain box shapes, when blank parts need to be folded about two groove lines that are substantially perpendicular to each other, for example, parts forming the top of the box in addition to the side flaps, the blanks are usually conveyed through the machine twice, the blank being turned by about 90° for the second conveyance, such that the parts being folded are disposed along the lengthwise side of the machine for each conveyance.

To enable such boxes to be processed with only one conveyance through the machine, it is known to turn the boxes by about 90° before performing the second folding. EP 0 881 173 B1 describes a device of this type which includes two conveying sections arranged alongside each other along the path of the articles for turning the folded boxes by as much as about 180°, the speeds of which can be separately adjusted. The articles lie on both conveying sections, so that they can be turned about an axis substantially perpendicular to the plane of conveyance when the two conveying sections have different speeds. In order for the articles to be conveyed at the speed of the two conveyors each time, a suction mechanism is arranged underneath the conveying elements which increases the frictional force between the conveying elements and the articles by creating a partial vacuum.

The conveyors are mounted in a frame. The frame can be transversely adjusted with respect to the machine frame in order to orient the box blanks so that they are substantially centered with respect to a center axis of the other processing stations of the folded box gluing machine located downstream.

From EP 1 345 827 B1, a device is known for the turning flat articles in which the conveying elements define only a single conveying section. At one side next to the conveying section, a sliding surface extends substantially flush with the conveying plane in which a brake element is arranged that can be activated by a clock. With the brake element, a portion of the blank sliding over the sliding surface can be braked. Since the other portions of the blank continue their motion, a turning movement is performed.

From EP 1 593 481 A1, a device is known for turning flat articles with an immovably arranged transport component for the blanks and with a control unit, which controls the servo-drives of the machine components provided before and after the turning station and which can be transversely positioned, depending on the type of folded box being produced.

SUMMARY OF THE INVENTION

Preferred embodiments of the present invention provide a device for turning flat articles with which different box blanks can be turned and with which the outfitting times required to adjust the machine can be reduced.

A device for the turning of flat articles according to a preferred embodiment of the present invention includes conveying elements which define at least two conveying sections that are permeable to air. Articles are conveyed on these conveying sections lying substantially flat. The conveying elements are mounted in a frame. Each conveying section includes a separate drive for the conveying elements. The frame including the conveying elements is mounted such that it can swivel about a pivot in an exit region of the device relative to a machine frame. This makes it possible to adjust the conveying paths of the turning module in the blank entry region in order to facilitate the turning process for the blanks. Advantageously, this configuration does not alter the transport path in the exit region of the turning module. Therefore, no position corrections need to be performed for the transport elements of the following processing stations.

In one preferred embodiment of the present invention, the air-permeable conveying sections are defined by suction bands.

In an alternative preferred embodiment of the present invention, the air-permeable conveying sections are defined by conveying rollers.

In another preferred embodiment of the present invention, each conveying section includes its own drive for its respective conveying elements.

In another preferred embodiment, the swiveling of the frame about the pivot is automatically performed via a control unit and a drive. This enables facilitates the adjustability depending on the shape of the blank.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The device is a portion of a folded box gluing machine for manufacturing folded boxes from blanks such as described, for example, in DE 198 28 820-A. Folded box gluing machines, include several processing stations through which the blanks/boxes move in succession, i.e., a laying-in unit, which pulls the blanks off a stack at high speed, one after the other, then a so-called pre-breaker, which makes the groove lines soft and supple by bending them through about 180°, and then at least one folding station, at the beginning of which an adhesive is applied in a strip to the fold flaps being glued and then the side fold flaps are folded toward the middle. The folded boxes, lying substantially flat, are then transported through a gathering and pressing mechanism, where they are pressed to set the adhesive.

The device according to a preferred embodiment of the present invention is preferably integrated in a folded box gluing machine including two folding stations and arranged in front of the second folding station. The blanks exiting from the first folding station with side flaps already folded are turned in the device about an axis substantially perpendicular to the conveying plane, so that, in the following folding station, other fold flaps are arranged at the side and therefore can be folded by the usual folding elements. In the present preferred embodiment, the blanks are turned by about 90° in order to orient the top and/or bottom flaps at a side position in which the respective groove line runs substantially parallel to the conveying direction.

The angle by which the turning is performed depends on the blank being processed. The blank. The blank is turned by the angle at which the groove lines of the fold flaps run at a slant to each other so as to orient the groove line of the next fold flap to be folded so as to be substantially parallel to the conveying direction, for example, when making hexagonal boxes, a turning of about 60°, for example, is performed.

Figure 1:
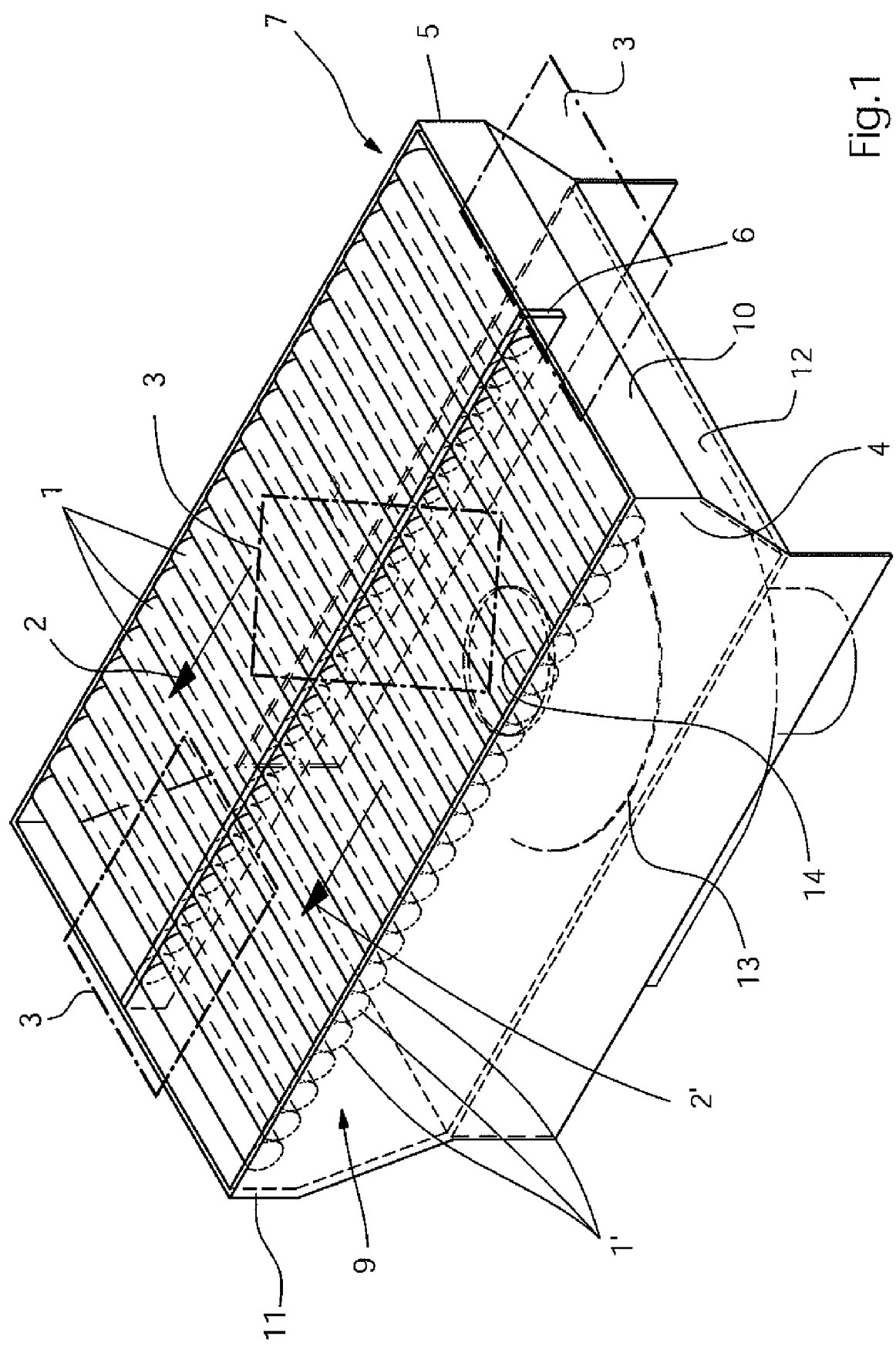
FIG. 1 is a perspective view of a device according to a preferred embodiment of the present invention.
Figure 2:
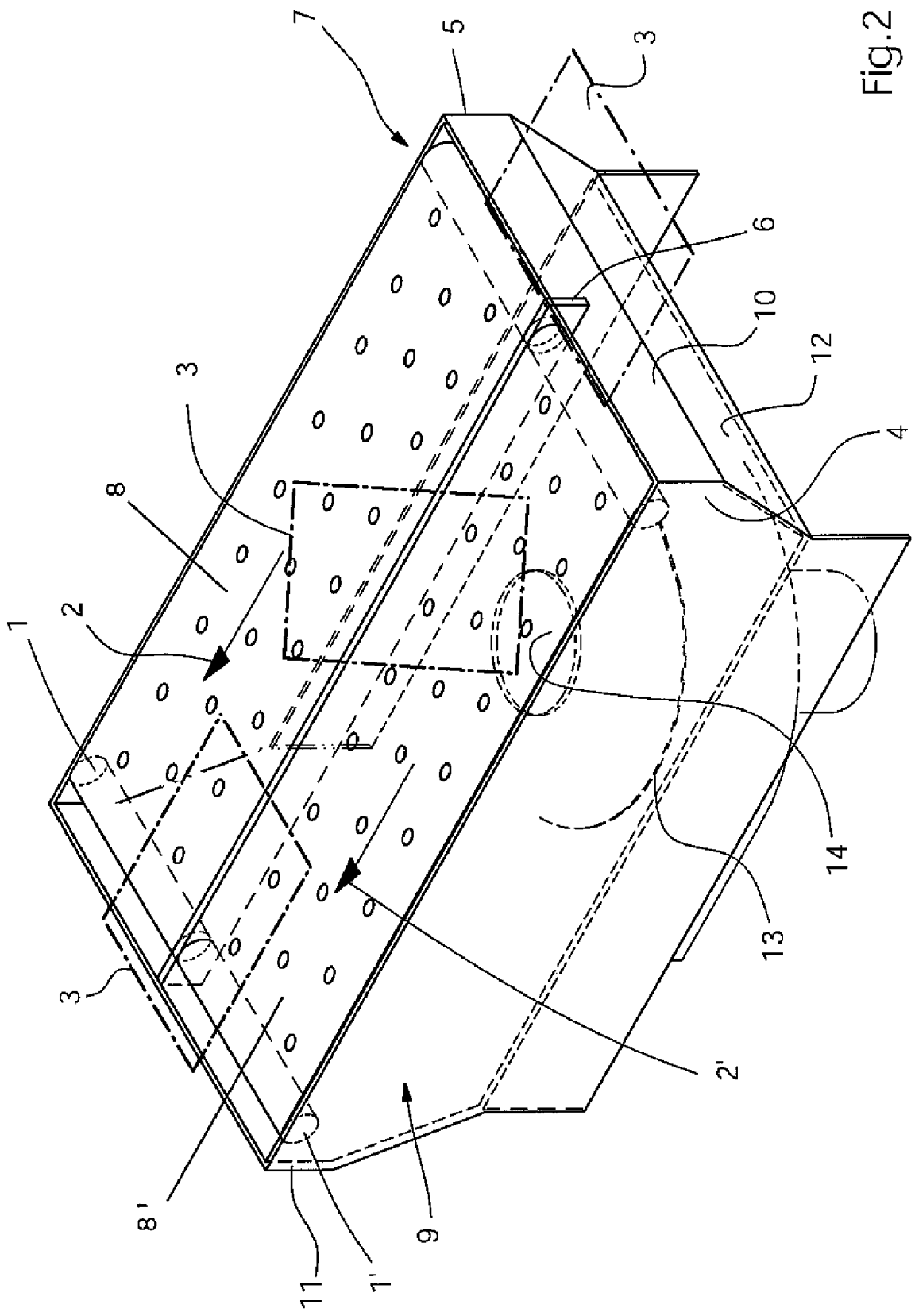
FIG. 2 is a perspective view of a device according to an alternative preferred embodiment of the present invention.

In the preferred embodiment shown in FIG. 1, two rows of rollers 1 and 1' define conveying elements, arranged in two conveying sections 2, 2' on which the blanks 3 are conveyed lying substantially flat (from right to left in FIG. 1). The rollers 1, 1' are each mounted at their ends in side frames components 4, 5, 6 of a frame 7 and are connected via known driving devices to a rotary drive, not shown. The rollers 1, 1' are arranged substantially parallel to each other and with a small spacing therebetween, so that the conveying sections are permeable to air. Instead of the rollers 1, 1', endless suction bands 8, 8' can also be used as conveying elements, as shown in FIG. 2.

The space beneath the rollers 1, 1' or suction bands 8, 8' is configured as a suction chamber 9, which is bounded at the sides by the frame components 4, 5 in front and behind by frame components 10, 11, on top by the air-permeable conveying sections, and below by a bottom plate 12 having an opening 14. The suction chamber 9 is connected via the opening 14 in the bottom plate 12 to a suction blower 13, which provides variable adjustment of a partial vacuum. When a partial vacuum is established in the suction chamber 9, the blanks 3 conveyed on the rollers 1, 1' or suction bands 8, 8' are pressed against the rollers 1, 1' or suction bands 8, 8' to increase the friction between the rollers 1, 1' or suction bands 8, 8' and the blanks 3.

Figure 3:
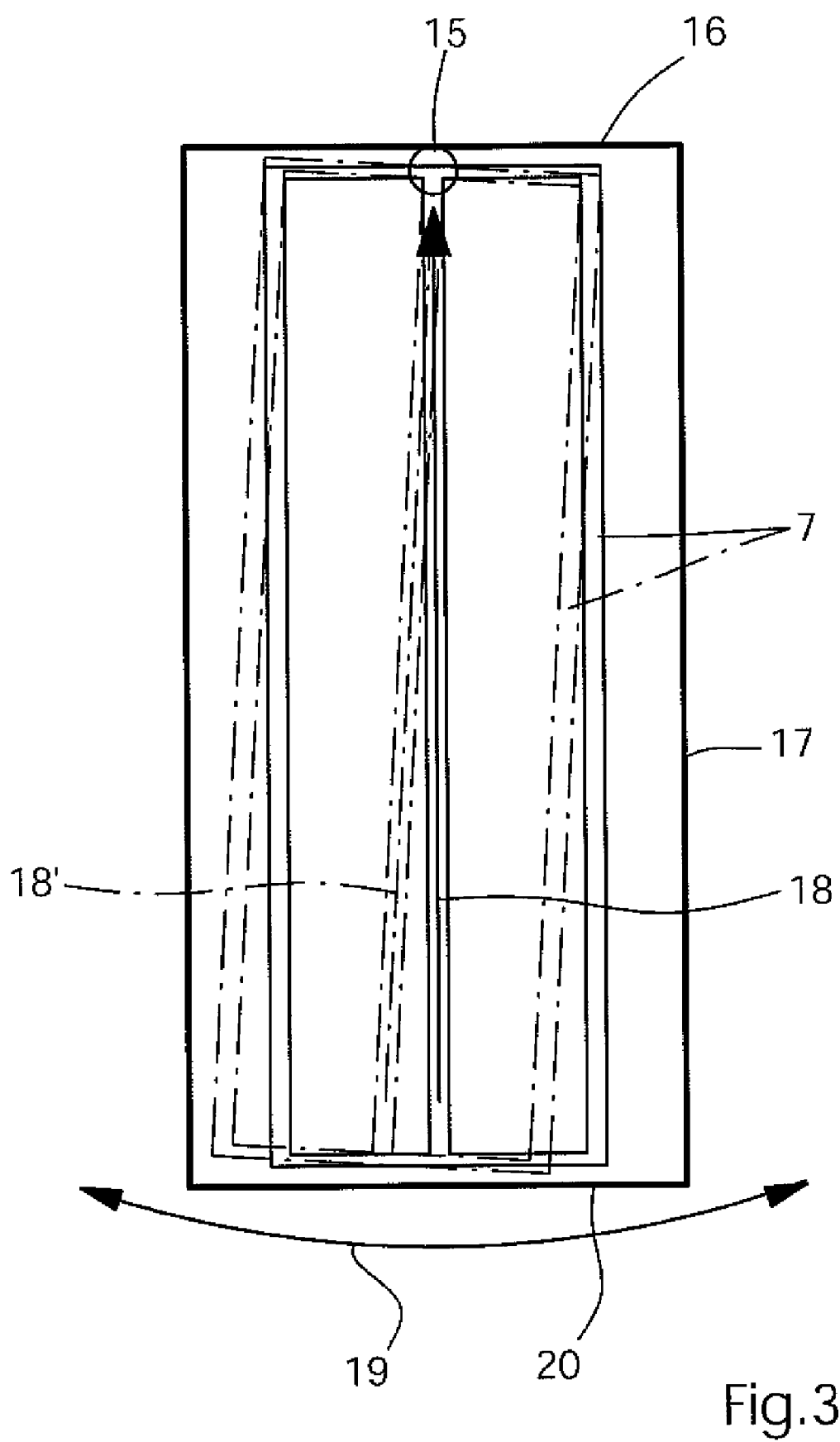
FIG. 3 is a schematic view of a device according to another preferred embodiment of the present invention in various working positions.

FIG. 3 schematically shows the swivel movement of the frame 7 relative to the machine frame 17. For the sake of improved clarity, the conveying elements are not shown in FIG. 3. For a better understanding, the device according to preferred embodiments of the present invention has been illustrated and described with respect to its essential components, namely, the frame 7, the machine frame 17, and the pivot 15. The frame 7, in which the conveying elements 1, 1', 8 8' are mounted, as mentioned above, can be turned about a pivot 15 in the exit region 16. The turning about the pivot 15 produces a swivel movement 19 of the frame in the entry region 20, and thus, produces a swivel movement of the conveying axis 18, 18'. In this manner, the pressing process to set the adhesive can be effectively initiated without having to make position corrections for the transport elements in the following sections.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A device for the turning flat articles comprising:
a frame including a pivot at an exit region thereof;
conveying elements defining at least two conveying sections that are permeable to air and on which the articles are conveyed lying substantially flat, the conveying elements being mounted in the frame;
a suction device arranged to provide suction from below the conveying elements through the conveying section to increase friction between the conveying elements and the articles; and
a separate drive provided for each of the conveying elements of the respective conveying sections; wherein
the frame is mounted so as to swivel about the pivot in the exit region of the frame relative to a machine frame.

2. The device according to claim 1, wherein the conveying elements are suction bands.

3. The device according to claim 1, wherein the conveying elements are conveying rollers.

4. The device according to claim 1, wherein a swiveling of the frame about the pivot is automatically adjusted via a control unit and a drive depending on the shape of the articles.

* * * * *